(12) United States Patent
MacKarvich

(10) Patent No.: US 8,628,105 B2
(45) Date of Patent: Jan. 14, 2014

(54) BOAT TRAILER WITH FLOATABLE BUNK BOARD GUIDE-ON POSTS

(76) Inventor: Charles J. MacKarvich, Atlanta, GA (US)

( * ) Notice: Subject to any disclaimer, the term of this patent is extended or adjusted under 35 U.S.C. 154(b) by 99 days.

(21) Appl. No.: 13/253,462

(22) Filed: Oct. 5, 2011

(65) Prior Publication Data

US 2012/0261898 A1 Oct. 18, 2012

Related U.S. Application Data

(60) Provisional application No. 61/390,023, filed on Oct. 5, 2010.

(51) Int. Cl.
*B60P 3/10* (2006.01)

(52) U.S. Cl.
USPC ........................................ 280/414.1; 414/529

(58) Field of Classification Search
USPC ............... 280/414.1, 529; 414/535, 532, 533, 414/534, 529
See application file for complete search history.

(56) References Cited

U.S. PATENT DOCUMENTS

| 3,887,093 | A | | 6/1975 | Howell | |
|---|---|---|---|---|---|
| 4,715,768 | A | * | 12/1987 | Capps | ........................... 414/535 |
| 6,616,166 | B2 | | 9/2003 | Marchese | |
| 6,824,155 | B1 | * | 11/2004 | Heck | .......................... 280/414.2 |
| 7,413,209 | B2 | | 8/2008 | MacKarvich | |

* cited by examiner

*Primary Examiner* — Tony Winner
*Assistant Examiner* — Jacob Knutson
(74) *Attorney, Agent, or Firm* — Thomas/Horstemeyer, LLP

(57) ABSTRACT

A pair of bunk board guide-on post assemblies 30, 31 are mounted on opposite sides of the frame 20 of a boat trailer 4 just at the aft ends of the bunk boards 25, 26 of the trailer. The guide-on post assemblies each include a rectilinear upwardly extending support bar 38 that defines a longitudinal slot 50, and a buoyant guide-on post 44 is telescopically mounted downwardly about the support bar 38 and defines a laterally extending connector opening 52 that registers with the longitudinal slot. A connector pin 54 extends through the laterally extending connector opening of the guide-on post and through the longitudinal slot of the upwardly extending support bar so that the buoyancy of the guide-on posts telescopes upwardly in response to partial immersion of the bunk boards of the boat trailer, providing a visual indication of the location of the submerged ends of the bunk boards.

7 Claims, 6 Drawing Sheets

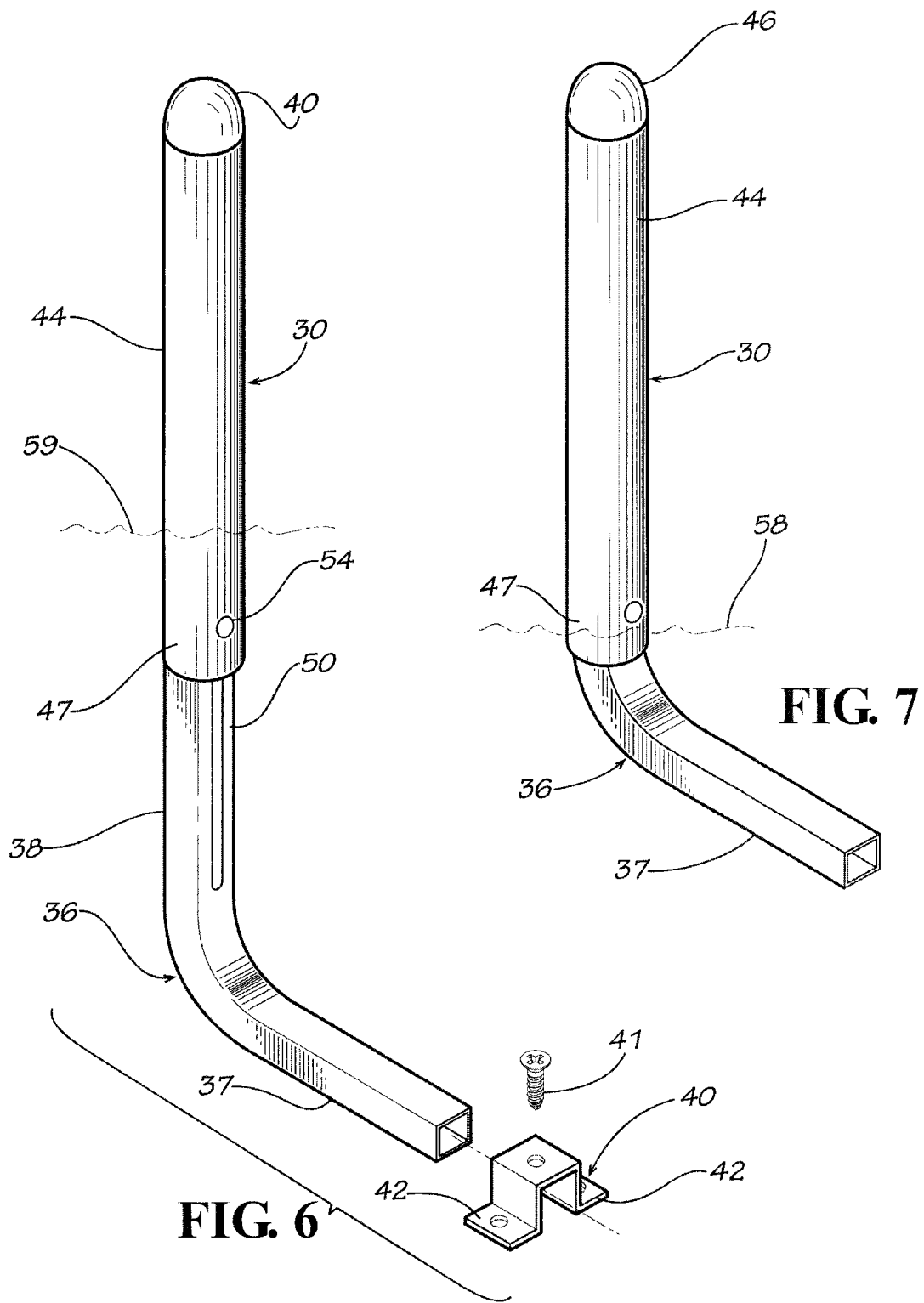

BOAT TRAILER WITH FLOATABLE BUNK BOARD GUIDE-ON POSTS

CROSS REFERENCE

Applicant claims priority to U.S. Provisional Patent Application Ser. No. 61/390,023, filed Oct. 5, 2010.

BACKGROUND OF THE INVENTION

Trailers that are used to haul boats over land usually include a frame mounted on wheels, a tongue extending forwardly from the frame that connects to a hitch ball of the towing vehicle, and parallel boat support boards, known as bunk boards, that are mounted to the frame. The trailer is backed down a boat launching ramp toward a body of water until the aft ends of the bunk boards are submerged in the water. A winch mounted over the tongue of the trailer is connected to the bow of the boat and is used to pull the boat from the water onto the bunk boards. The bunk boards are arranged so that their load bearing surfaces generally conform to the shape of the boat hull and are sometimes mounted on pivots so that they can tilt slightly to have their load bearing surfaces positioned in flat abutment with the curved hull of the boat.

When the boat is in the water and the boat trailer is backed down a ramp to retrieve the boat, its wheels and the aft ends of the bunk boards become submerged in the water so that the boat hull can engage the aft ends of the bunk boards at a position beneath the surface of the water. The momentum of the boat moving toward the trailer causes the boat to first engage the aft ends of the bunk boards that are not readily visible to the driver of the boat, and then the momentum of the boat usually carries the boat partially up the bunk boards toward the forward portion of the trailer, depending upon the skill of the driver. In some instances, there will be a current in the water, such as water adjacent a river bank, that tends to move the boat sideways as the boat is approaching the trailer and as the boat first engages the bunk boards. If the trailer is driven down the ramp a distance that makes the bunk boards deep in the water, the driver of the boat might misjudge the position of the bunk boards and the boat might not be properly aligned with the trailer as the boat approaches the trailer.

It would be helpful if the driver of the boat could accurately determine the positions of the submerged ends of the bunk boards and the position of the approaching bow of the boat with respect to the bunk boards as the boat approaches the trailer for mounting on the trailer.

SUMMARY OF THE DISCLOSURE

Briefly described, the present disclosure concerns a boat trailer with guide-on post assemblies for guiding a boat operator when the boat operator drives the boat through water and toward the trailer to mount the boat on the bunk boards of the trailer.

Bunk board guide-on post assemblies disclosed herein may be mounted on each side of the boat trailer for marking the positions of the bunk boards. The bunk board guide-on post assemblies may be mounted on the frame of the trailer at predetermined positions, usually on the longitudinal frame elements that extend fore and aft of the wheels of the trailer, typically at positions aft of the wheels of the trailer to mark the aft ends of the bunk boards.

The bunk board guide-on post assemblies each may include an upwardly extending support bar and a floatable marker telescopically mounted on said support bar. The floatable markers may be in the form of guide-on posts. The guide-on posts may be rectilinear and tubular. The bunk board guide-on posts may be positioned outboard of and at the aft ends of the bunk boards.

The bunk board guide-on posts may include tubular floats that trap air for lifting the posts when submerged. The support bars may extend upwardly from the framework of a boat trailer, and the guide-on posts are movably retained on the support bars and are floatable in water.

The tubular guide-on post may be telescopically mounted about the support bar. The support bar may be a rectilinear support bar for mounting in an upwardly extending attitude on the boat trailer, and a longitudinal slot may be formed in the support bar. A guide-on post is telescopically mounted downwardly about the upwardly extending support bar and defines a laterally extending connector opening that registers with the longitudinal slot of the support bar. A connector may extend through the laterally extending connector opening of the guide-on post and through the longitudinal slot of said support bar, so that the guide-on post is buoyant in water and is movable along the support bar in response to partial immersion of the guide-on post, and the connector moves with the guide-on post along the longitudinal slot. The longitudinal slot limits the distance of upward movement of the guide-on post.

The support for the guide-on post may be L-shaped including a laterally extending leg for mounting to the trailer framework and the upwardly extending rectilinear support bar. The upwardly extending rectilinear support bar defines the longitudinal slot and the connector may comprise a connector pin that extends through the longitudinal slot.

Other objects features and advantages of the invention will become apparent upon reading the specification and drawings attached hereto and as defined by the following claims.

BRIEF DESCRIPTION OF THE DRAWINGS

FIG. 6 is a perspective view of the bunk board guide-on post assembly distended in its floating position.

FIG. 7 is a perspective view, similar to FIG. 6, but showing the bunk board guide-on post assembly in its retracted position.

DETAILED DESCRIPTION

Figure 1:
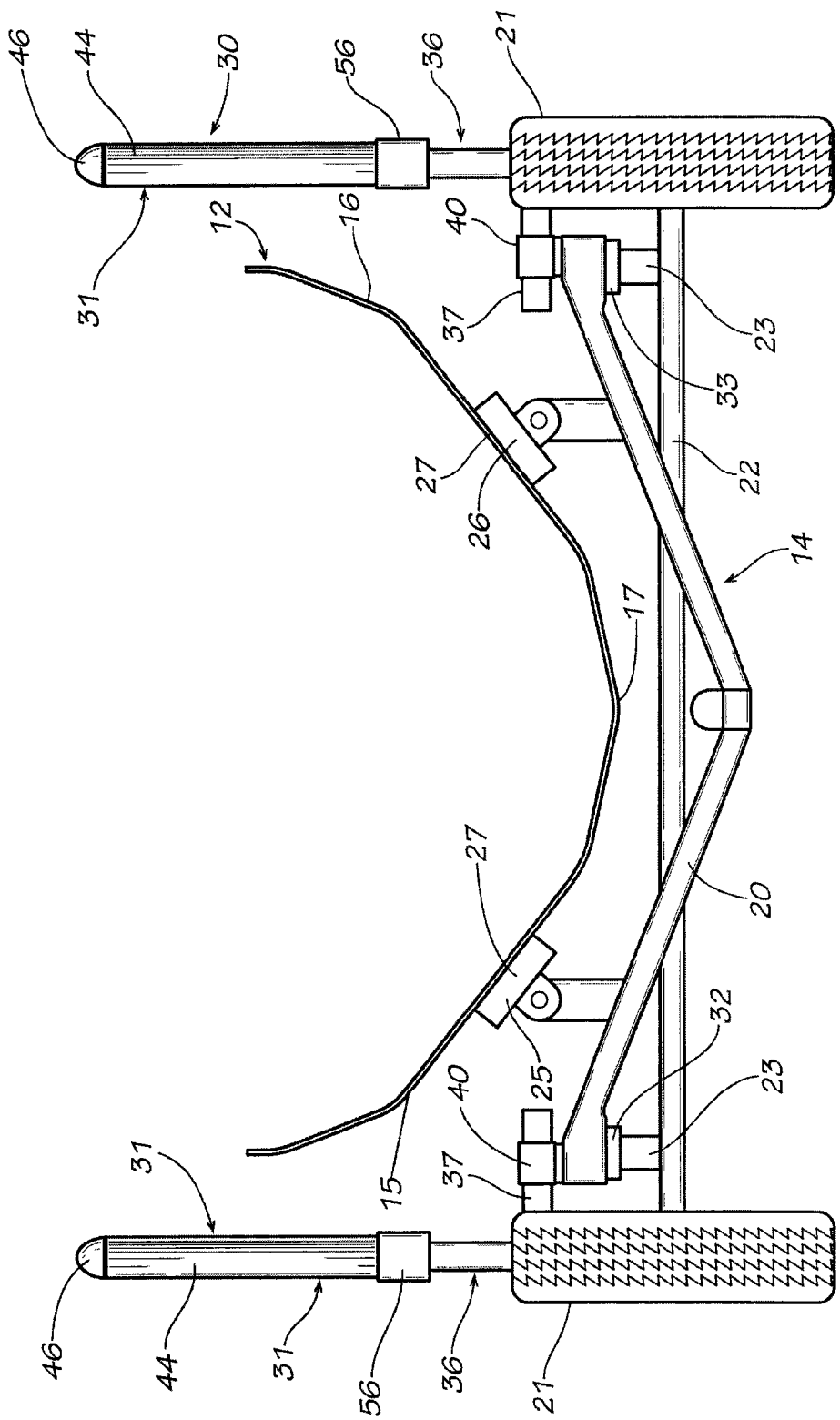
FIG. 1 is a front elevational view of a boat trailer with the shape of a boat hull mounted on the bunk boards of the trailer, showing the bunk board guide-on post assemblies at opposite sides of the boat.
Figure 2:
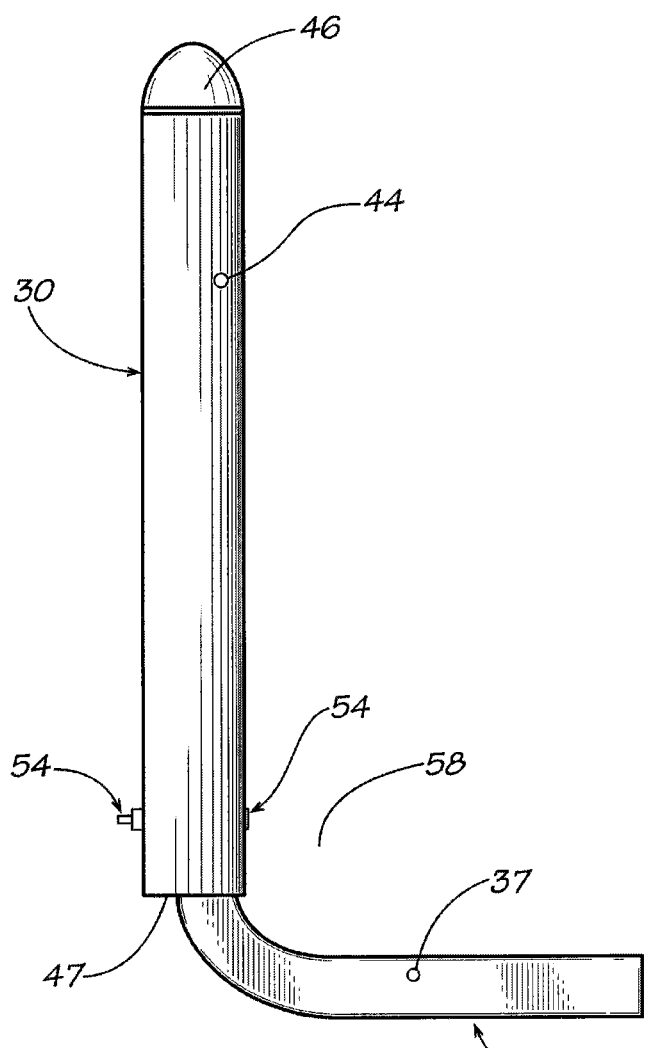
FIG. 2 is a front elevational view of the bunk board guide-on post assembly in its retracted position.
Figure 3:
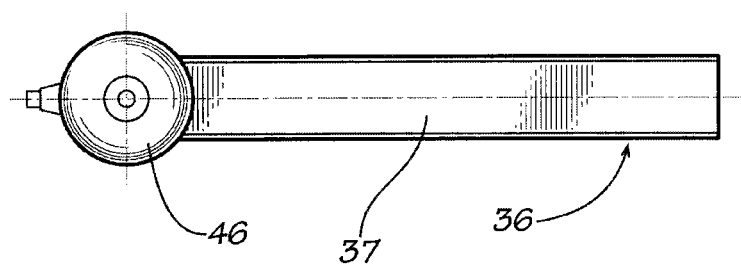
FIG. 3 is a top view of the bunk board guide-on post assembly.

Referring now in more detail to the drawings, in which like numerals indicate like parts throughout the several views, FIG. 1 illustrates a boat hull 12 mounted on a boat trailer 14.

The boat hull illustrated in the drawings is of a conventional design in that it includes opposed sloped sides 15 and 16, with a keel 17.

Boat trailer 14 includes a frame 20 with wheels 21, axle 22, and suspension springs 23 supporting the frame on the axle. Bunk boards 25 and 26 are mounted rigidly or pivotally to the frame 20. Bearing surfaces 27 of the bunk boards are able to make substantially flat abutment with the facing surfaces of the sloped sides 15 and 16 of the boat hull due to the pivotal mounting and flexibility of the bunk boards. This is conventional in the art.

Bunk board guide-on post assemblies 30 and 31 are mounted on opposite sides of the trailer to the longitudinal frame members 32 and 33 of the trailer frame 20 at the aft ends of the bunk boards 25.

As shown in FIGS. 2-8, the bunk board guide-on post assemblies 30, 31 each include an L-shaped support 36 that includes a laterally extending leg 37 and an upwardly extending rectilinear tubular bar 38. A mounting bracket 40 (FIG. 5) for mounting the support bar 36 to the trailer frame is provided that may be an inverted U-shaped bracket that includes lateral legs for attachment to the longitudinal frame members 32, 33 of the trailer frame 20. The mounting brackets are of conventional design and their U-shaped portions are sized and shaped to straddle the laterally extending leg 37 of the L-shaped support 36, as shown in FIG. 1.

Once the laterally extending leg 37 of the L-shaped support 36 is telescopically moved into the mounting bracket 40, a set screw or other fastener may be used to capture the L-shaped support bar in a fixed position on the longitudinal frame members 32 of the boat frame 20.

The bunk board guide-on post assemblies 30, 31 each include a floatable guide-on post 44 that is hollow and is telescopically supported by the upwardly extending tubular support bar 38 of the L-shaped support 36. In this embodiment, the guide-on post 44 is a tubular marker that is topped by a cap 46 that closes the upper portion thereof to form a water tight seal and is open at its lower end 47, trapping air within the interior of the tubular marker. The guide-on posts 44 extend upwardly from the opposite sides of the boat trailer, as shown in FIG. 1.

The floatable bunk board guide-on posts 44 may be moved closer to or farther away from the bunk boards 25 and 26 by sliding the laterally extending legs 37 of the L-shaped supporters 36 through the mounting brackets 40, as may be desired.

Figure 8:
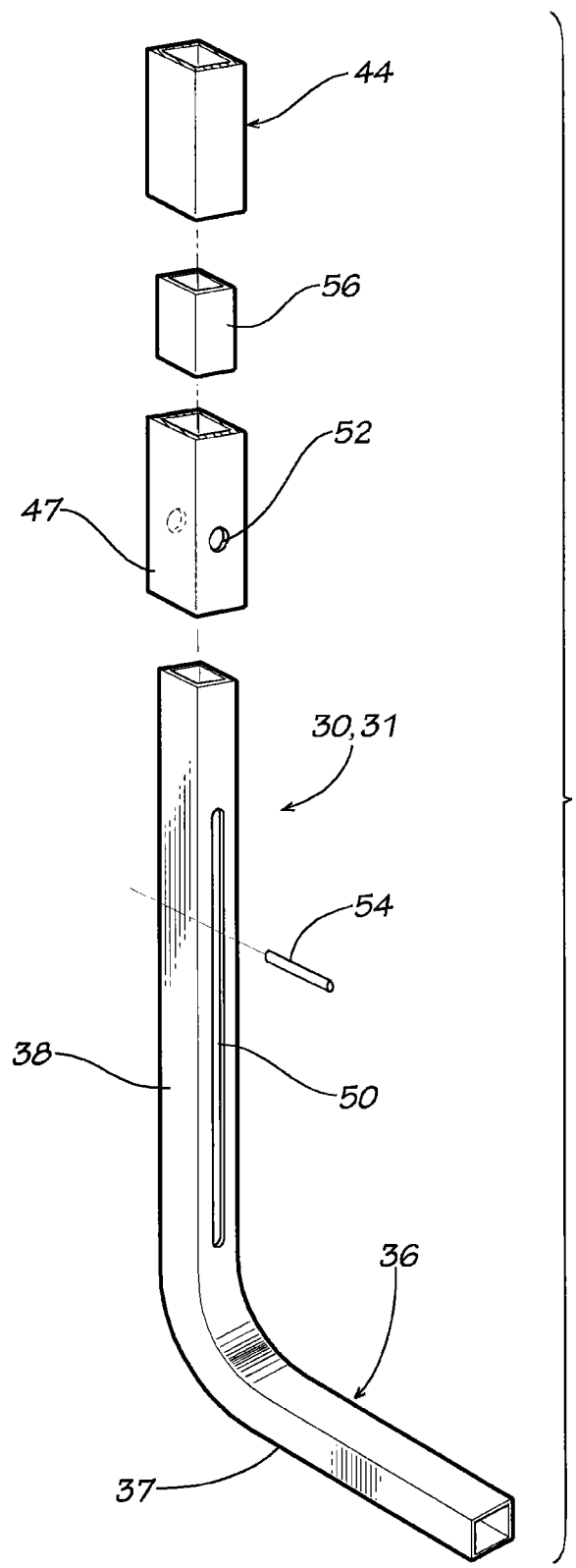
FIG. 8 is a perspective, expanded view of the bunk board guide-on post assembly with the segmented guide-on post suspended above the support bar and with the retainer sleeve aligned with the guide-on post.
Figure 9:
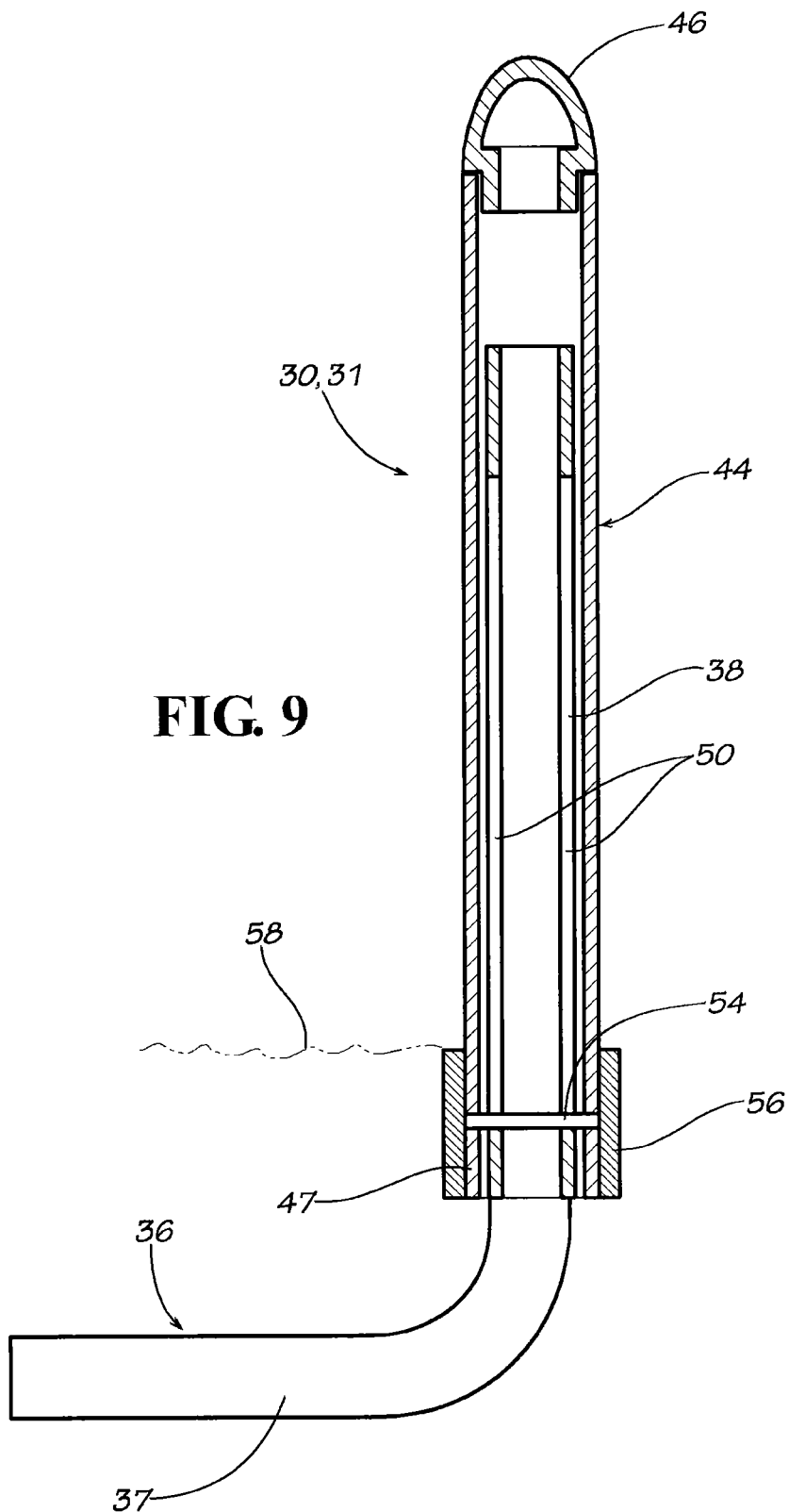
FIG. 9 is a front elevational view, in cross section, of the bunk board guide-on post assembly in its retracted position.

As shown in FIGS. 8 and 9, the upwardly extending tubular support bars 38 of the L-shaped support 36 are rectilinear and include a vertical slot 50 extending along their lengths.

The guide-on posts 44 each include a connector pin opening 52 adjacent its lower end, and connector pins 54 extend through the connector pin opening 52 and through the vertical slot 50 of the upwardly extending tubular support bar 38 of the L-shaped support 36. A pin retainer sleeve 56 (FIGS. 8 and 9) may surround the lower end portion of the guide-on post 44 at the connector pin opening so as to close the connector pin opening, thereby trapping the connector pin 54 in the guide-on post 44.

When the bunk board guide-on post assemblies 30 and 31 have been assembled as shown in FIGS. 2, 4, 7 and 9 and mounted to the framework of a boat trailer as shown in FIG. 1, the guide-on posts 44 move under the influence of gravity in a downward direction until the connector pin 54 of each guide-on post engages the lower end of the vertical slot 50 of the upwardly extending support bar 38, so that the guide-on post 44 bottoms out in the position as shown in FIGS. 7 and 9.

Figure 4:
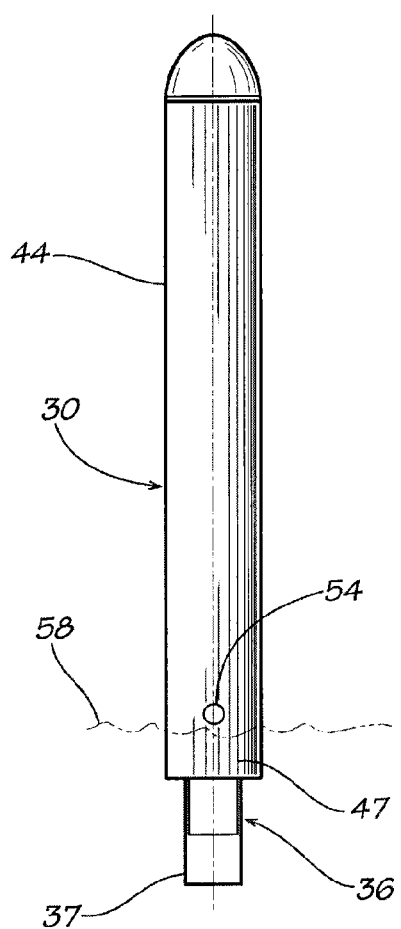
FIG. 4 is a side elevational view of the bunk board guide-on post assembly.
Figure 5:
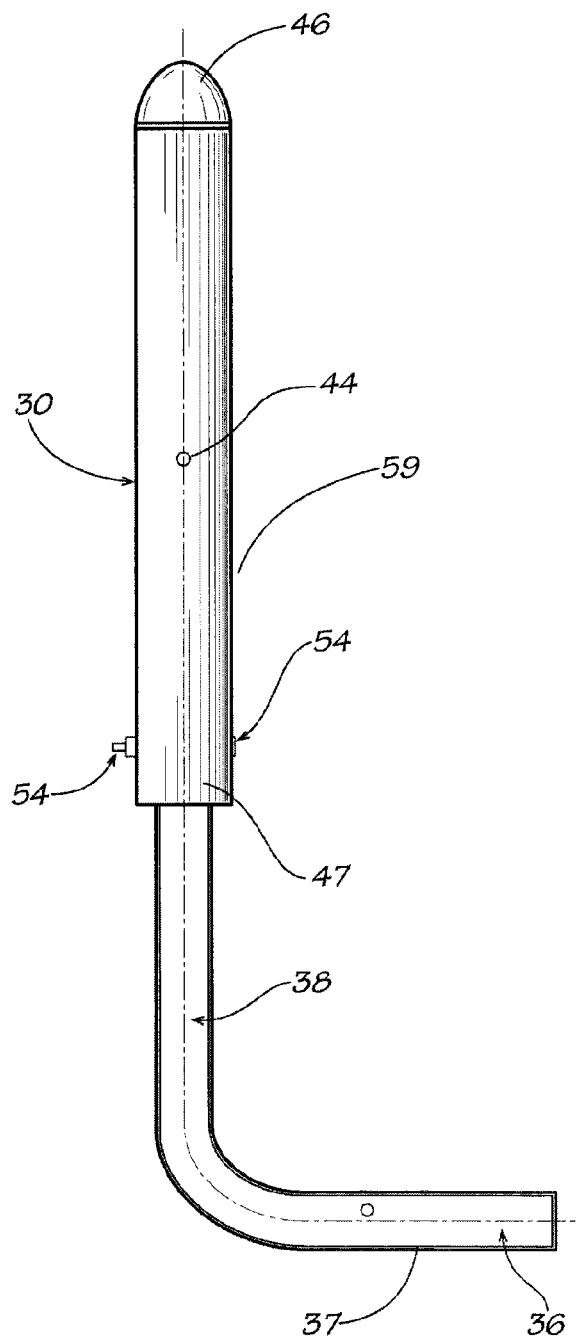
FIG. 5 is a front elevational view of the bunk board guide-on post assembly, similar to FIG. 2, but showing the guide-on post distended.

When the boat trailer 14 is moved down a ramp until its bunk boards 25 and 26 (FIG. 1) are submerged at their aft ends, the water level at the floatable guide-on posts 44 will begin to rise from the low water level 58 as illustrated in FIGS. 4 and 7 at the open lower end 47 of the guide-on posts 44. As the trailer moves farther down the boat ramp, the water level will reach higher levels 59 as shown in FIGS. 5 and 6 that traps air inside the guide-on posts, causing the guide-on posts to become buoyant. This tends to lift the guide-on posts against the forces of gravity so that the guide-on posts are distended upwardly along the upwardly extending support bar 38 of the L-shaped support 36.

Although the rear portions of the bunk boards 25 and 26 (FIG. 1) may disappear beneath the surface of the water, the guide-on posts 44 of the floatable bunk board guide-on post assemblies 30 and 31 will indicate the positions of the ends of both of the bunk boards, providing a guide path for the boat operator to move the boat between the guide-on posts.

Once the boat is properly secured to the trailer and the operator of the towing vehicle begins to move the boat and trailer out of the water, the water level with respect to the guide-on posts 44 will recede so that the guide-on posts are no longer lifted by the water as shown in FIGS. 5 and 6 but will move downwardly back to their original non-floating positions of FIGS. 4 and 7.

When the bunk board guide-on posts 30, 31 are collapsed, they are in a position where they are less likely to be accidentally engaged by people or objects passing nearby.

The guide-on posts also may be formed of floatable material that lifts the posts when submerged in water.

Although preferred embodiments of the invention have been disclosed herein, it will be obvious to those skilled in the art that variations and modifications of the disclosed embodiments can be made without departing from the spirit and scope of the invention.

The invention claimed is:

1. A boat trailer comprising:
   an elongated trailer framework,
   a pair of bunk boards extending along the sides of said framework,
   a pair of bunk board guide-on-post assemblies mounted to said trailer framework,
   each said bunk board guide-on post assembly including
      an L-shaped support including a laterally extending leg for mounting to said trailer framework and an upwardly extending rectilinear support bar, said upwardly extending rectilinear support bar defining a longitudinal slot therein, and
      a rectilinear tubular guide-on post defining a laterally extending connector pin opening that registers with said longitudinal slot,
   a connector pin extending through said laterally extending connector pin opening of said rectilinear tubular guide-on post and through said longitudinal slot of said upwardly extending rectilinear support bar of said L-shaped support, and
   said rectilinear tubular guide-on post has an open lower end and a closed upper end that traps air in response to the level of water rising above said open lower end,
   such that said rectilinear tubular guide-on post is movable along said upwardly extending rectilinear support bar of said L-shaped support in response to partial immersion of said rectilinear tubular guide-on post and said connector pin moves with said tubular guide-on post along said longitudinal slot and said longitudinal slot limits the distance of movement of said tubular guide-on post.

2. The boat trailer of claim 1, and further including a cylindrically shaped sleeve surrounding said rectilinear tubular guide-on post at the connector pin configured to retain said connector pin from moving out of said rectilinear tubular guide-on post.

3. The boat trailer of claim 1, wherein said bunk board guide-on posts are positioned outboard of said bunk boards.

4. A bunk board guide-on post assembly for mounting to a boat trailer framework, comprising
- a rectilinear support bar for mounting in an upwardly extending attitude on the boat trailer, said support bar defining there through a longitudinal slot, and
- a guide-on post telescopically mounted downwardly about said support bar and defining a laterally extending connector opening that registers with said longitudinal slot,
- a connector extending through said laterally extending connector opening of said guide-on post and through said longitudinal slot of said support bar, and
- said guide-on post having an open lower end and a closed upper end that traps air in response to the level of water rising above said open lower end, such that said guide-on post is buoyant in water and is movable along said rectilinear support bar in response to partial immersion of said guide-on post and said connector moves with said guide-on post along said longitudinal slot and said longitudinal slot limits the distance of movement of said guide-on post.

5. The bunk board guide-on post assembly of claim 4, wherein said guide-on post is tubular and formed of a material that is buoyant in water.

6. The bunk board guide-on post assembly of claim 4, wherein said guide-on post is tubular and is telescopically mounted about said support bar.

7. The bunk board guide-on post assembly of claim 4, and wherein said connector comprises a connector pin, and further including a pin retainer surrounding said guide-on post at said connector pin for retaining said connector pin in said guide-on post.

* * * * *